US011232499B2

(12) United States Patent
Hwang et al.

(10) Patent No.: US 11,232,499 B2
(45) Date of Patent: Jan. 25, 2022

(54) APPARATUS AND METHOD FOR PROVIDING COOPERATIVE SHOPPING SERVICE IN ASSOCIATION WITH CHAT APPLICATION

(71) Applicant: KAKAO CORP., Jeju-si (KR)

(72) Inventors: Do Yon Hwang, Seoul (KR); Kyoung Jin Han, Seoul (KR); Jun Hwan Lee, Seoul (KR); Dong Wha Yuk, Seoul (KR); Woo Yeol Baek, Seoul (KR); Ji Yoong Choi, Seoul (KR); Ji Yeon Shin, Incheon (KR); Yeon Hee Shin, Seongnam-si (KR); Mi Ran Kang, Yongin-si (KR); Sheung Min Shin, Seoul (KR); Yun Ji Koh, Seongnam-si (KR); Du Hyeong Kim, Yongin-si (KR); Chang Sung Ban, Seongnam-si (KR); Hyun Hee Park, Bucheon-si (KR); Ji Eun Kim, Gwacheon-si (KR); Jin Young Choi, Seoul (KR)

(73) Assignee: KAKAO CORP., Jeju-si (KR)

( * ) Notice: Subject to any disclaimer, the term of this patent is extended or adjusted under 35 U.S.C. 154(b) by 259 days.

(21) Appl. No.: 15/953,568

(22) Filed: Apr. 16, 2018

(65) Prior Publication Data
US 2018/0300782 A1 Oct. 18, 2018

(30) Foreign Application Priority Data

Apr. 17, 2017 (KR) .......................... 10-2017-0049384

(51) Int. Cl.
*G06Q 30/00* (2012.01)
*G06Q 30/06* (2012.01)
(Continued)

(52) U.S. Cl.
CPC ......... *G06Q 30/0605* (2013.01); *G06Q 20/12* (2013.01); *G06Q 20/202* (2013.01);
(Continued)

(58) Field of Classification Search
CPC ........ G06Q 30/0601–0645; G06Q 20/12–209; G06Q 20/202; H04L 12/1859; H04L 51/046–32; H04L 51/14; H04L 51/32
(Continued)

(56) References Cited

U.S. PATENT DOCUMENTS 6,338,050 B1 * 1/2002 Conklin ............. G06Q 30/0641
705/15
2009/0172565 A1 * 7/2009 Jackson ............. G06Q 30/0643
705/44
(Continued)

FOREIGN PATENT DOCUMENTS

JP  2001331501 A  11/2001
JP  2013156951 A  8/2013
(Continued)

OTHER PUBLICATIONS

Mai, Andy. "Group Ordering Just Became Easier with New IMessage Integration." DoorDash Engineering Blog, Sep. 30, 2020, doordash.engineering/2016/11/07/group-ordering-just-became-easier-with-new-imessage-integration/. (Year: 2016).*

*Primary Examiner* — Resha Desai
*Assistant Examiner* — Kennedy Gibson-Wynn
(74) *Attorney, Agent, or Firm* — Hamre, Schumann, Mueller & Larson, P.C.

(57) ABSTRACT

An apparatus that provides a cooperative shopping service in association with a chat application includes a friend information receiving unit configured to receive, from a host device, information about at least one friend or chat room selected from a list of multiple friends or multiple chat
(Continued)

rooms managed by the chat application; an invitation unit configured to transmit an invitation message to a guest device corresponding to the friend or a member of the chat room through the chat application; and a cooperative shopping service providing unit configured to provide, both to the host device and the guest device, a list of products that are capable of being put into a shopping cart of the host device and receive order information about product selected from the list of products by at least one of the host device and the guest device, wherein the list of products provided to the host device and the guest device is generated based on a location of a delivery destination determined by the host device.

13 Claims, 13 Drawing Sheets

(51) Int. Cl.
    *G06Q 20/12* (2012.01)
    *H04L 12/58* (2006.01)
    *G06Q 20/20* (2012.01)
    *H04L 12/18* (2006.01)
(52) U.S. Cl.
    CPC ....... *G06Q 20/209* (2013.01); *G06Q 30/0603* (2013.01); *G06Q 30/0635* (2013.01); *H04L 12/1859* (2013.01); *H04L 51/046* (2013.01); *H04L 51/14* (2013.01); *H04L 51/32* (2013.01); *G06Q 30/0641* (2013.01)

(58) Field of Classification Search
    USPC .................................................. 705/26.1–27.2
    See application file for complete search history.

(56) References Cited

U.S. PATENT DOCUMENTS

| | | | |
|---|---|---|---|
| 2010/0017307 A1* | 1/2010 | Barbour | G06Q 10/10 705/26.1 |
| 2012/0185355 A1* | 7/2012 | Kilroy | G06Q 30/0633 705/26.8 |
| 2013/0346245 A1* | 12/2013 | Desore | G06Q 20/10 705/26.41 |
| 2014/0279235 A1* | 9/2014 | Sandholm | G06Q 30/0603 705/27.1 |
| 2015/0006308 A1* | 1/2015 | Lin | G06Q 30/0605 705/26.2 |
| 2015/0235304 A1* | 8/2015 | Vincent | G06Q 30/0641 705/14.23 |
| 2016/0171478 A1* | 6/2016 | Kwon | G06Q 20/29 705/44 |
| 2016/0171578 A1* | 6/2016 | Bawge | G06Q 30/0613 705/26.41 |

FOREIGN PATENT DOCUMENTS

| | | |
|---|---|---|
| KR | 1020080026792 A | 3/2008 |
| KR | 1020140101501 A | 8/2014 |
| KR | 1020150145358 A | 12/2015 |
| KR | 1020160006342 A | 1/2016 |
| KR | 1020160037572 A | 4/2016 |

* cited by examiner

APPARATUS AND METHOD FOR PROVIDING COOPERATIVE SHOPPING SERVICE IN ASSOCIATION WITH CHAT APPLICATION

CROSS-REFERENCE TO RELATED APPLICATION

This application claims the benefit under 35 USC 119(a) of Korean Patent Application No. 10-2017-0049384 filed on 17 Apr. 2017, in the Korean Intellectual Property Office, the entire disclosures of which are incorporated herein by reference for all purposes.

TECHNICAL FIELD

The present disclosure relates to an apparatus and method for providing a cooperative shopping service in association with a chat application.

BACKGROUND

Generally, social network services (SNS) provide a function that enables a user to have relationships with other users and maintain and manage the relationships. Further, the SNS provides a communication function that enables users to exchange messages. The users may have public, semi-public, and private communication with each other.

Recently, an instant messaging service has been commercialized. The instant messaging service enables acquaintances to exchange instant messages and thus instantly share information in the mobile and online environment using a chat application or messenger functioning as a communication platform.

In this regard, Korean Patent Laid-open Publication No. 10-2008-0026792 (entitled "System for instant messaging service and method thereof") discloses an instant messenger of a communication device, including: a data memory that stores flash data having various play properties depending on a time of receipt from an instant messenger of the other party's communication device; a system memory that stores a flash component having a play routine of the flash data and a messenger; and a processing unit that plays the flash data differently over time with the flash component by executing the messenger of the system memory.

A major function of the instant messaging service provided by a conventional instant messenger or chat application is to transmit text-based information messages. However, users of the instant messaging service are increasingly demanding various functions beyond transmission of information messages.

SUMMARY

In view of the foregoing, the present disclosure provides an apparatus that enables a cooperative shopping service to be provided in association with a chat application, and a method therefor. The present disclosure provides an apparatus capable of inviting multiple friends or members of a chat room managed by a chat application to a cooperative shopping service in a host device, and a method therefor. The present disclosure provides an apparatus capable of providing a list of products generated based on the location of a delivery destination determined by a host device, and a method therefor. The present disclosure provides an apparatus capable of terminating a cooperative shopping service once payment for products selected by at least one of a host device and a guest device is completed, and a method therefor.

However, problems to be solved by the present disclosure are not limited to the above-described problems. There may be other problems to be solved by the present disclosure.

According to an exemplary embodiment of the present disclosure, an apparatus that provides a cooperative shopping service in association with a chat application may include a friend information receiving unit configured to receive, from a host device, information about at least one friend or chat room selected from a list of multiple friends or multiple chat rooms managed by the chat application; an invitation unit configured to transmit an invitation message to a guest device corresponding to the friend or a member of the chat room through the chat application; and a cooperative shopping service providing unit configured to provide, both to the host device and the guest device, a list of products that are capable of being put into a shopping cart of the host device and receive order information about product selected from the list of products by at least one of the host device and the guest device, wherein the list of products provided to the host device and the guest device is generated based on a location of a delivery destination determined by the host device.

According to another exemplary embodiment of the present disclosure, a method for providing a cooperative shopping service by an apparatus in association with a chat application may include receiving, from a host device, information about at least one friend or chat room in a list of multiple friends or multiple chat rooms managed by the chat application; transmitting an invitation message to a guest device corresponding to the friend or a member of the chat room through the chat application; providing, both to the host device and the guest device, a list of products that are capable of being put into a shopping cart of the host device; and receiving order information about product selected from the list of products by at least one of the host device and the guest device, wherein the list of products provided to the host device and the guest device is generated based on a location of a delivery destination determined by the host device.

According to another exemplary embodiment of the present disclosure, a host device that provides a cooperative shopping service in association with a chat application may include an invitation unit configured to receive a user's input to select at least one friend or chat room from a list of multiple friends or multiple chat rooms managed by the chat application and transmit information about the selected friend or chat room to a server in order for an invitation message to be transmitted to a guest device corresponding to the selected friend or a member of the selected chat room; and a cooperative shopping service providing unit configured to provide a list of products that are capable of being put into a shopping cart of the host device, provide information about product selected from the list of products by at least one of the host device and the guest device, and transmit order information about the selected products to the server, wherein the list of products provided to the host device and the guest device is generated based on a location of a delivery destination determined by the host device.

According to another exemplary embodiment of the present disclosure, a method for providing a cooperative shopping service by a host device in association with a chat application may include receiving a user's input to select at least one friend or chat room from a list of multiple friends or multiple chat rooms managed by the chat application;

transmitting information about the selected friend or chat room to a server in order for an invitation message to be transmitted to a guest device corresponding to the selected friend or a member of the selected chat room; providing a list of products that are capable of being put into a shopping cart of the host device; providing information about products selected from the list of products by at least one of the host device and the guest device, and transmit order information about the selected product to the server; and transmitting order information about the selected product to the server, wherein the list of products provided to the host device and the guest device is generated based on a location of a delivery destination determined by the host device.

According to any one of the embodiments described above, it is possible to provide an apparatus that enables a cooperative shopping service to be provided in association with a chat application to link the chat application to an online purchasing service, and a method therefor.

Further, according to any one of the embodiments described above, it is possible to provide an apparatus capable of inviting multiple friends or members of a chat room managed by a chat application to a cooperative shopping service in a host device to use an online purchasing service in cooperation with the acquaintances in the chat application, and a method therefor.

Furthermore, according to any one of the embodiments described above, it is possible to provide an apparatus capable of providing a list of products generated based on the location of a delivery destination determined by a host device to extract customized products based on metadata of the host device that requests a cooperative shopping service, and a method therefor.

Moreover, according to any one of the embodiments described above, it is possible to provide an apparatus capable of terminating a cooperative shopping service once payment for products selected by at least one of a host device and a guest device is completed to seamlessly link and switch the cooperative shopping service to a chat application, and a method therefor.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
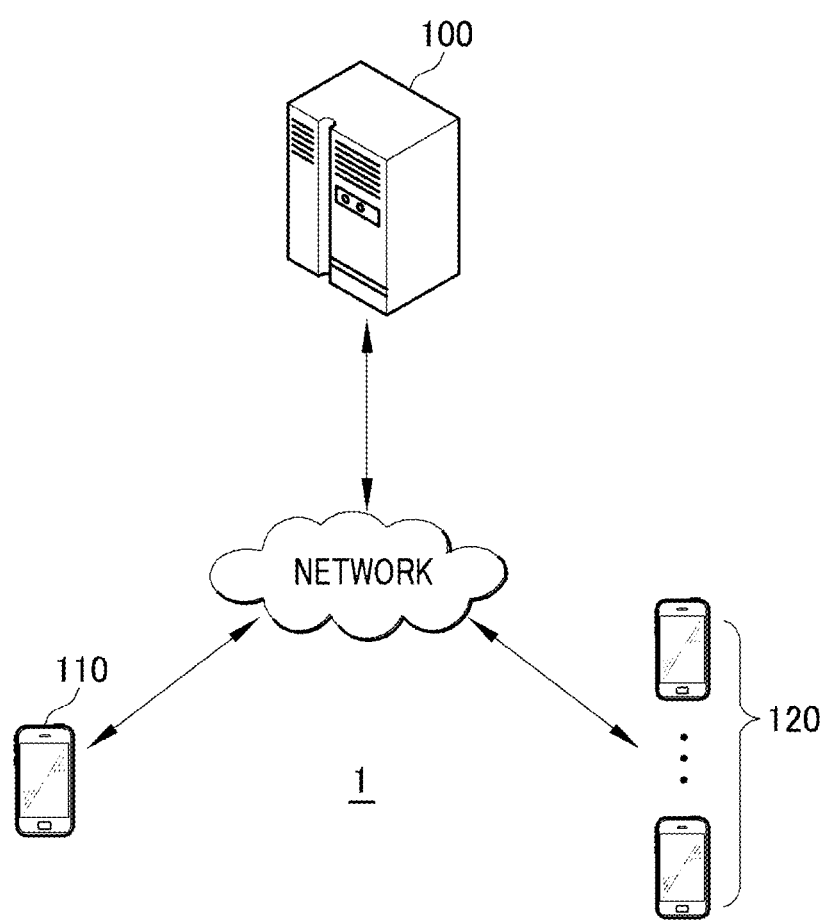
FIG. 1 is a configuration diagram of a cooperative shopping service providing system in accordance with various embodiments described herein.

Hereafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Throughout this document, the term "connected to" that is used to designate a connection or coupling of one element to another element includes both an element being "directly connected" another element and an element being "electronically connected" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware. However, the "unit" is not limited to the software or the hardware and may be stored in an addressable storage medium or may be configured to implement one or more processors. Accordingly, the "unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided by the "units" can be combined with each other or can be divided up into additional components. Further, the components and the "units" may be configured to implement one or more CPUs in a device or a secure multimedia card.

FIG. 1 is a configuration diagram of a cooperative shopping service providing system in accordance with an embodiment of the present disclosure.

FIG. 1 is a configuration diagram of a cooperative shopping service providing system in accordance with an embodiment of the present disclosure. Referring to FIG. 1, a cooperative shopping service providing system 1 may include an apparatus 100, a host device 110, and a guest device 120. The apparatus 100, the host device 110, and the guest device 120 are illustrated as example components which can be controlled by the cooperative shopping service providing system 1.

The components of the cooperative shopping service providing system 1 illustrated in FIG. 1 are typically connected to each other via a network. For example, as illustrated in FIG. 1, the apparatus 100 may be connected to the host device 110 and the guest device 120 simultaneously or with a time interval.

The network refers to a connection structure that enables information exchange between nodes such as devices and servers. Examples of the network may include, 3G, 4G, 5G, Wi-Fi, Bluetooth, Internet, LAN (Local Area Network), Wireless LAN (Wireless Local Area Network), WAN (Wide Area Network), PAN (Personal Area Network), and the like, but are not limited thereto.

The apparatus 100 is a kind of server which the host device 110 and the guest device 120 can access. The apparatus 100 can provide a cooperative shopping service in association with a chat application to the host device 110 and the guest device 120. Meanwhile, the apparatus 100 of the present disclosure may be configured to provide an instant messaging service to the host device 110 and the guest device 120 prior to providing the cooperative shopping service.

The chat application of the present disclosure refers to an application which is installed in each device to provide a chat room between friends registered for instant messaging service, and a web browser can also provide the chat room for instant messaging service. For reference, the chat room may refer to a virtual space provided on a server in order for two or more users to exchange instant messages.

Further, the cooperative shopping service of the present disclosure is an online purchasing service provided to the host device 110 that requests the cooperative shopping service and the guest device 120 invited by the host device 110 in association with a previously contracted product provider, and can provide a service that enables the guest device 120 as well as the host device 110 to put a product into a shopping cart of the host device 110 and also enables payment for products selected during shopping performed by the host device 110 in cooperation with the guest device 120.

That is, the present disclosure provides the cooperative shopping service in association with the chat application that provides the instant messaging service, and, thus, a user of the host device 110 can easily invite a friend managed by the chat application to the shopping cart of the host device 110. Therefore, in the case where a cooperative operation such as purchasing of items required for a specific event is needed, the cooperative shopping service facilitates cooperation between the user of the host device 110 and the invited user of the guest device 120.

Further, the present disclosure can provide a shopping service that enables the user of the host device 110 and the invited user of the guest device 120 to easily select products they want and thus simultaneously satisfies the needs of the user of the host device 110 and the invited user of the guest device 120.

Specifically, the apparatus 100 may provide the host device 110 with a list of multiple friends or multiple chat rooms managed by chat application. Further, the apparatus 100 may receive information about at least one of the friends or chat rooms selected from the provided list from the host device 110.

The apparatus 100 may transmit an invitation message to the guest device 120 corresponding to the friend or a friend of the chat room through the chat application.

If the apparatus 100 receives an acceptance signal in response to the invitation message from the guest device 120, the apparatus 100 may provide, both to the host device 110 and the guest device 120, a list of products that are capable of being put into the shopping cart of the host device 110. In this case, the list of products provided to the host device 110 and the guest device 120 may be generated based on the location of a delivery destination determined by the host device 110.

The apparatus 100 may receive information about payment for products selected by at least one of the host device 110 and the guest device 120 from the list of products provided to the host device 110 and the guest device 120.

The host device 110 configured to access the apparatus 100 may be an intelligent device having a computer supporting function, such as Internet communication and information search. A chat application that provides a chat room for instant messaging service may be installed in the host device 110, and a web browser or another application program previously installed therein can also provide the chat room for instant messaging service. Otherwise, the host device 110 may be configured to access the apparatus 100 such as a PC through wired/wireless communication.

The host device 110 may display the instant messages which are transmitted and received between the users in the chat room of the chat application on a chat window.

The host device 110 may request the cooperative shopping service from the apparatus 100. If the cooperative shopping service is provided as a function in the chat application, the host device 110 may request the cooperative shopping service from the apparatus 100 through the chat application. If the cooperative shopping service is installed in the host device 110 as a program independent of the chat application, the host device 110 may directly request the cooperative shopping service from the apparatus 100 without executing the chat application. In the case where the host device 110 directly requests the cooperative shopping service from the apparatus 100 without executing the chat application, the host device 110 may be provided with a list of multiple friends or chat rooms managed by the chat application from the apparatus 100 and then may provide the list to the user.

The host device 110 may receive the user's input to select at least one of the friends or chat rooms from the provided list in order to send an invitation to the shopping cart of the host device 110. Further, the host device 110 may transmit information about the selected friend or chat room to the apparatus 100 in order for the invitation message to be transmitted to the guest device 120 corresponding to the friend selected by the user's input or a friend of the selected chat room.

The host device 110 may directly enter the shopping service from the chat room of the chat application without transmitting an invitation message. In this case, when the user of the host device 110 may make a select and swipe input for an additional menu of a chat room in the ongoing chat room, the host device 110 may invite members of the chat room to participate in the cooperative shopping service. That is, the user of the host device 110 may invite the members of the chat room previously generated through the chat application to participate in the cooperative shopping service without transmitting and receiving an invitation message during a conversation with the members of the chat room through the chat room. For example, the additional menu may be displayed in the bottom of the chat room in response to the user's input in the chat room and may include multiple items such as photo, video, camera, and shortcut for cooperative shopping service. The host device 110 may receive an input to select the shortcut for cooperative shopping service displayed in the additional menu and directly invite the members of the chat room to the cooperative shopping service. Further, in the case where the host device 110 receives a swipe input from the user of the host device 110 while displaying the chat room, the cooperative shopping service may be executed.

The host device 110 may receive the list of products that are capable of being put into the shopping cart of the host device 110 from the apparatus 100 and provide the list of products to the user. In this case, the list of products provided to the host device 110 and the guest device 120 may be generated based on the location of a delivery destination determined by the host device 110.

The host device 110 may receive the user's input to select at least one product from the list of products, and at least one of the host device 110 and the guest device 120 that accepts the invitation message may receive information about the product selected from the list of products from the apparatus 100 and then provide the information to the user. Further, the host device 110 may receive information about a product selected from the list of products by the guest device 120 participating in the cooperative shopping service from the apparatus 100 without sending an invitation message of the host as described in the above example. Meanwhile, in the case where the guest device 120 is invited to the cooperative shopping service without an invitation message from the host device 110 or the guest device 120' acceptance of the invitation is not required, the guest device 120 may display identification information about the invitation related to the cooperative shopping service to inform the user of the guest device 120. The guest device 120 may enter the cooperative shopping service referring to the identification information.

Then, if the user of the host device 110 is requested to pay for the provided products, the host device 110 may transmit payment information about the provided products to the apparatus 100. The payment information may include order information required for ordering the selected products. In this case, the order information may include information about the selected products and information about payment amount. Then, information required for processing payment (approving payment) may be transmitted and received between the apparatus 100 and a credit card company server or a payment agency server.

The guest device 120 configured to access the apparatus 100 may be at least one device invited to the cooperative shopping service at the request of the host device 110. That is, the guest device 120 of the present disclosure refers to a device corresponding to at least one friend invited to the cooperative shopping service by the host device 110 from among multiple friends registered in the chat application installed in the host device 110 and a device corresponding to a member of a group chat room invited to the cooperative shopping service by the host device 110. In this case, any member of the invited group chat room may be invited to the cooperative shopping service even if he/she is not registered as a friend in the chat application installed in the host device 110.

The guest device 120 may receive an invitation message in the form of an instant message from the apparatus 100 through the previously installed chat application by invitation of the host device 110.

The guest device 120 may accept the received invitation message by the user's input. If the guest device 120 accepts the invitation message, the guest device 120 may transmit an acceptance signal in response to the invitation message to the apparatus 100. Then, the guest device 120 may be provided with a list of products that are capable of being put into the shopping cart of the host device 110 from the apparatus 100.

The guest device 120 may receive the user's input to select at least one product from the list of products, and at least one of the host device 110 and the guest device 120 may receive information about the product selected from the list of products from the apparatus 100 and then provide the information to the user. In this case, payment for the selected product may be made by the host device 110.

Regarding the payment for the selected product, it has been described that the payment is made by the host device that requests the cooperative shopping service, but the payment may be made by the guest device 120 corresponding to another user appointed by the host device 110 from among the members participating in the cooperative shopping service.

The host device 110 and the guest device 120 are devices in which an application can be installed and may include, for example, all kinds of wireless communication devices ensuring portability and mobility such as 3G, 4G and 5G devices, smart phone, smart pad, tablet PC, PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), and Wibro (Wireless Broadband Internet) device.

Figure 2:
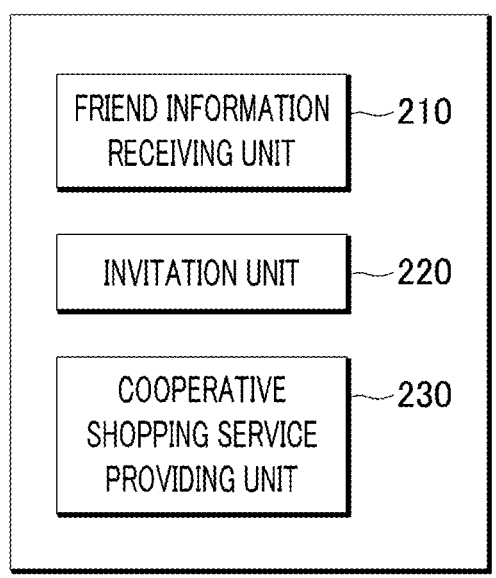
FIG. 2 is a configuration diagram of an apparatus in accordance with various embodiments described herein.

FIG. 2 is a configuration diagram of an apparatus in accordance with an embodiment of the present disclosure.

As illustrated in FIG. 2, the apparatus 100 in accordance with an embodiment may include a friend information receiving unit 210, an invitation unit 220, and a cooperative shopping service providing unit 230. Hereinafter, each of the components will be described in detail.

The friend information receiving unit 210 may provide a list of multiple friends or chat rooms managed by the chat application to the host device 110. The multiple friends may be acquaintances of the user of the host device 110 and previously managed by the chat application installed in the host device 110, and the chat rooms may be chat rooms where the user of the host device 110 participates in to exchange instant messages with other users. In this case, any user who is not registered as a friend of the host device 110 may also be included as a member of the cooperative shopping service. For example, if the friend information receiving unit 210 receives a request for the cooperative shopping service from the host device 110, the friend information receiving unit 210 may provide the host device 110 with a list of multiple friends managed by the chat application or multiple chat rooms where the user of the host device 110 participates in.

The friend information receiving unit 210 may receive, from the host device 110, information about at least one of the friends or chat rooms selected by an input of the user of the host device 110 from the list of friends or chat rooms provided to host device 110. In this case, the received information about a chat room may include information about each member participating in the chat room.

Further, in the case of directly entering the shopping service from the chat application, the friend information receiving unit 210 may receive information about members of the chat room from the host device 110, and, thus, the user of the host device 110 can participate in the cooperative shopping service by making a select and swipe input for an additional menu of a chat room in the ongoing chat room. That is, the friend information receiving unit 210 may receive information about the members of the chat room invited without transmitting and receiving an invitation message, and, thus, the user of the host device 110 can participate in the cooperative shopping service. For example, the additional menu may be displayed in the bottom of the chat room in response to the user's input in the chat room and may include multiple items such as photo, video, camera, and shortcut for cooperative shopping service. The host device 110 may receive an input to select the shortcut for cooperative shopping service displayed in the additional menu and directly invite the members of the chat room to the cooperative shopping service.

The invitation unit 220 may transmit an invitation message to the friend invited by the host device 110 through the chat application. Specifically, the invitation unit 220 may transmit the invitation message to the guest device 120 corresponding to the friend or a friend of the chat room corresponding to information received from the host device 110 through the chat application. In this case, the invitation unit 220 may transmit the invitation message in the form of an instant message to the guest device 120 through the chat application.

For example, if at least one friend is selected from the list of friends by the host device 110, the invitation message may be provided to a private chat room with the selected friend. For another example, if at least one group chat room is selected from the list of chat rooms by the host device 110, the invitation message may be provided to the selected group chat room. Meanwhile, the invitation message may be transmitted to any member of the group chat room even if he/she is not registered as a friend of the host device 110.

If the cooperative shopping service requested by the host device 110 is terminated, the invitation unit 220 may transmit a cooperative shopping complete message to the friend who performs the cooperative shopping service through the chat application. That is, the cooperative shopping complete message may be received by the guest device 120 which has participated in the cooperative shopping service. For example, if the cooperative shopping complete message is provided to a group chat room, the cooperative shopping complete message is available to be read only by a host and a guest participating in cooperative shopping from members in the group chat room. Also, cooperative shopping complete message may include information about the number of completely purchased products among products paid for, the total purchase amount, a delivery company to deliver the products paid for, and stores where the products paid for are located. Meanwhile, the invitation message may include a message accepting the invitation by the user's input or a message indicating the result of the invitation without a need for acceptance of the invitation.

The cooperative shopping service providing unit 230 may provide a general function related to the cooperative shopping service to the host device 110 and the guest device 120 invited by the host device 110. Specifically, the cooperative shopping service providing unit 230 may receive an acceptance signal in response to the invitation message from the guest device 120. In this case, the cooperative shopping service providing unit 230 may provide, both to the host device 110 and the guest device 120, a list of products that are capable of being put into the shopping cart of the host device 110.

The list of products provided to the host device 110 and the guest device 120 may include at least one of purchasable products and may be generated based on at least one product extracted based on the location of a delivery destination determined by the host device 110. For example, the list of products may include information about prices, total stocks, and kinds of products being sold in one or more stores (e.g., markets, convenience stores, etc.) located within a predetermined distance from the location of a delivery destination determined by the host device 110. Herein, the stores may sell certain kinds of products (e.g., clothing, foodstuffs, home appliances, furniture, etc.) set by the host device 110. The location of a delivery destination may be determined based on the user's input to the host device 110, such as GPS information corresponding to the current location of the host device 110, a specific local name or a point of interest (POI) on the map, and a place name directly input by the user.

The location of a delivery destination determined by the host device (inviter) may be different from the location of a delivery destination determined by the guest device (invitee). In this case, if products are exposed to each device depending on the location of a delivery destination determined by each device, different products may be exposed to the respective devices. That is, different products are exposed to the respective devices, and, thus, the host device and the guest device cannot perform shopping in cooperation with each other. Therefore, in the present disclosure, a list of products generated based on the location of a delivery destination determined by the host device that requests the cooperative shopping service is provided to the host device and the guest device in order to suppress the above-described situation.

The cooperative shopping service providing unit 230 may receive, from the host device 110 and the guest device 120, a request for information about products selected by at least one of the host device 110 and the guest device 120 from the list of products, and may provide the information about the selected products to the host device 110 and the guest device 120 in response to the request. For example, the information about the selected products may include the kinds, prices, manufactured dates, manufacturers, ingredients, and total stocks of the products.

The cooperative shopping service providing unit 230 searches for stores located within a predetermined distance from the location of a delivery destination or stores located in a predetermined area corresponding to the location of a delivery destination. Meanwhile, the predetermined area may be an administrative area determined based on postal code (e.g., Dong, Gu, etc.) and may be information about a specific space or section previously set by the stores or the apparatus 100. Further, the cooperative shopping service providing unit 230 may asks to a store server information about a store detected based on the location of the delivery destination and information about products being sold in the store. The cooperative shopping service providing unit 230 may provide the host device 110 and the guest device 120 with the information about the store and the information about the products being sold in the store received from the store server.

The cooperative shopping service providing unit 230 may receive information about payment for the selected products from the host device 110. For example, payment for the selected products may be made by the host device 110 based on the payment information. Further, the payment may be made by the guest device 120 corresponding to another user appointed by the host device 110 from among the members participating in the cooperative shopping service.

When the payment for the selected products is completed according to the payment information, the cooperative shopping service providing unit 230 may terminate the cooperative shopping service being provided to the host device 110 and the guest device 120. In this case, if the cooperative shopping service is terminated, the invitation unit 220 may transmit a cooperative shopping complete message to the guest device 120 provided with the cooperative shopping service through the chat application.

When the payment for the selected products is completed, the cooperative shopping service providing unit 230 may order the selected products in association with affiliated stores.

The cooperative shopping service providing unit 230 may provide the host device 110 and the guest device 120 with information about products purchased through the cooperative shopping service. For example, the cooperative shopping service providing unit 230 may provide a history of using the cooperative shopping service such as information about products purchased through previous cooperative shopping services or information about products purchased through the latest cooperative shopping service prior to providing the cooperative shopping service, and may provide a purchase tendency by comparing information about currently purchased products with the history of using the cooperative shopping service. That is, the cooperative shopping service providing unit 230 may provide the history of using the cooperative shopping service to enable the host device 110 and the guest device 120 to more conveniently use the cooperative shopping service.

Further, the cooperative shopping service providing unit 230 may provide information about a history or tendency of purchase performed by a specific chat room or friend through the cooperative shopping service. The information about the purchase history or purchase tendency may be displayed as an instant message in the chat room or through a separate UI.

Figure 3:
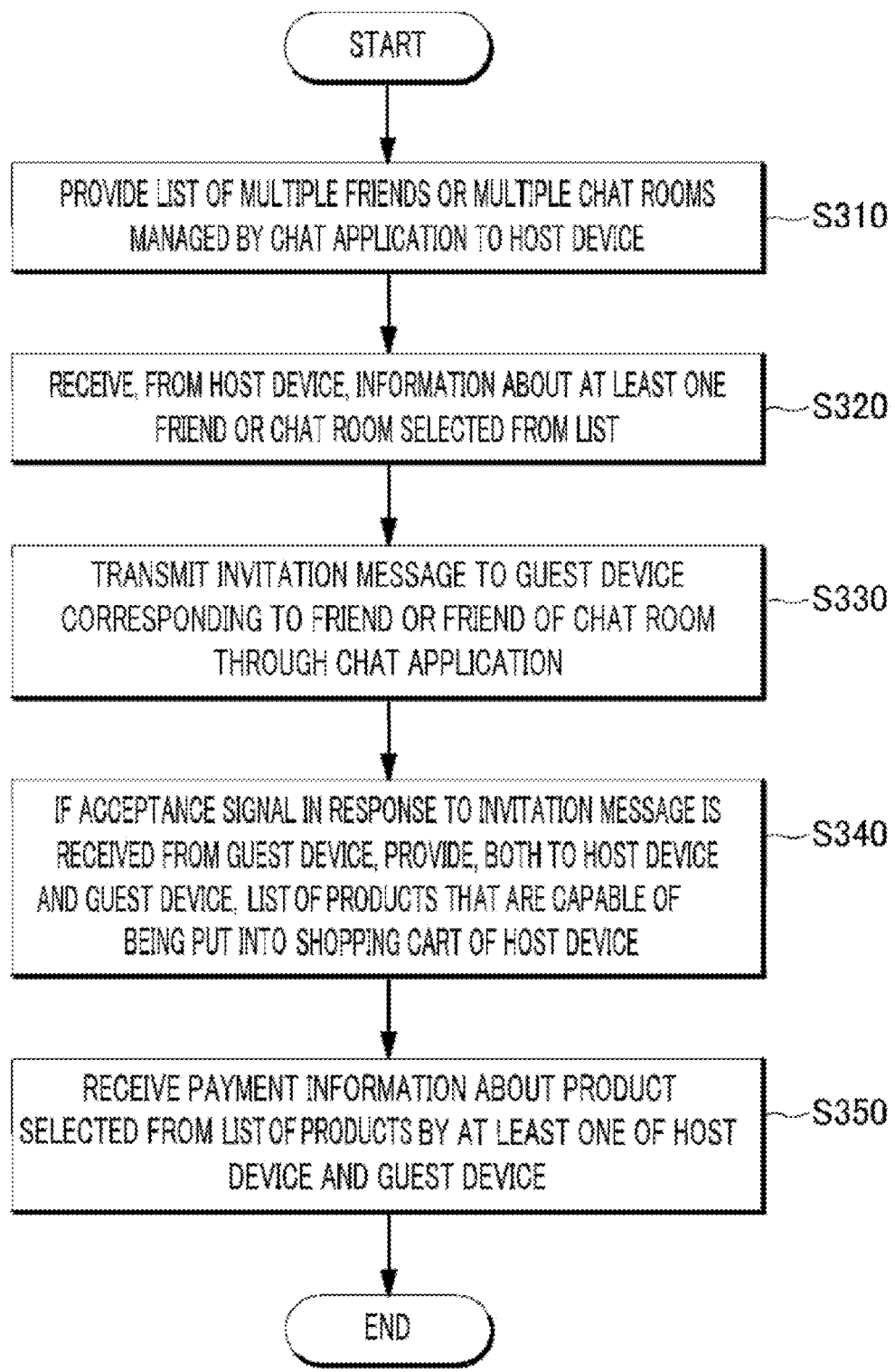
FIG. 3 is a flowchart provided to explain a method for providing a cooperative shopping service in an apparatus in accordance with various embodiments described herein.

FIG. 3 is a flowchart provided to explain a method for providing a cooperative shopping service in an apparatus in accordance with an embodiment of the present disclosure.

A method for providing a cooperative shopping service by the apparatus 100 in accordance with an embodiment illustrated in FIG. 3 includes the processes time-sequentially performed by the cooperative shopping service providing system 1 according to the embodiment illustrated in FIG. 1 and FIG. 2. Therefore, the descriptions of the processes performed by the cooperative shopping service providing system 1 may be applied to the method for providing a cooperative shopping service by the apparatus 100 according to the embodiment illustrated in FIG. 1 and FIG. 2, even though they are omitted hereinafter.

In a process S310, the apparatus 100 may provide a list of multiple friends or multiple chat rooms managed by the chat application to the host device 110. Prior to the present process, the apparatus 100 may receive a request for the list of multiple friends or chat rooms from the host device 110. Meanwhile, the apparatus 100 may receive, from the host device 110, a list of at least one friend selected for cooperative shopping service by an input, such as a long touch to any one friend from the list of multiple friends, through the chat application without providing the list of multiple friends or chat rooms and provide the cooperative shopping service to the friend corresponding to the received list. For another example, the apparatus 100 may receive an input to select the cooperative shopping service from the host device 110 by making a select and swipe input for an additional menu of a chat room in the ongoing chat room by the user of the host device 110 without providing the list of multiple friends or chat rooms and provide the cooperative shopping service to members of the chat room. For example, the additional menu may be displayed in the bottom of the chat room in response to the user's input in the chat room and may include multiple items such as photo, video, camera, and shortcut for cooperative shopping service. The host device 110 may receive an input to select the shortcut for cooperative shopping service displayed in the additional menu and directly invite the members of the chat room to the cooperative shopping service.

In a process S320, the apparatus 100 may receive, from the host device 110, information about at least one of the friends or chat rooms selected from the provided list.

In a process S330, the apparatus 100 may transmit an invitation message to the guest device 120 corresponding to the friend or a friend of the chat room corresponding to the information received from the host device 110 through the chat application.

In a process S340, if the apparatus 100 receives an acceptance signal in response to the invitation message from the guest device 120, the apparatus 100 may provide, both to the host device 110 and the guest device 120, a list of products that are capable of being put into the shopping cart of the host device 110. Further, the apparatus 100 may provide the list of products that are capable of being put into the shopping cart of the host device 110 to the guest device 120 invited without an invitation message.

In a process S350, the apparatus 100 may receive payment information about product selected from the list of products by at least one of the host device 110 and the guest device 120. For example, the payment information may refer to or include order information required for ordering the selected products. In this case, the order information may include information about the selected products and information about payment amount. Then, information required for processing payment (approving payment) may be transmitted and received between the apparatus 100 and a credit card company server or a payment agency server.

Although not described in FIG. 3, if the payment for the products selected by the host device 110 or a device of a user appointed by the host device 110 is made, the apparatus 100 may terminate the cooperative shopping service provided to the host device 110 and the guest device 120.

In the descriptions above, the processes S310 to S350 may be divided into additional processes or combined into fewer processes depending on an embodiment. In addition, some of the processes may be omitted and the sequence of the processes may be changed if necessary.

Figure 4:
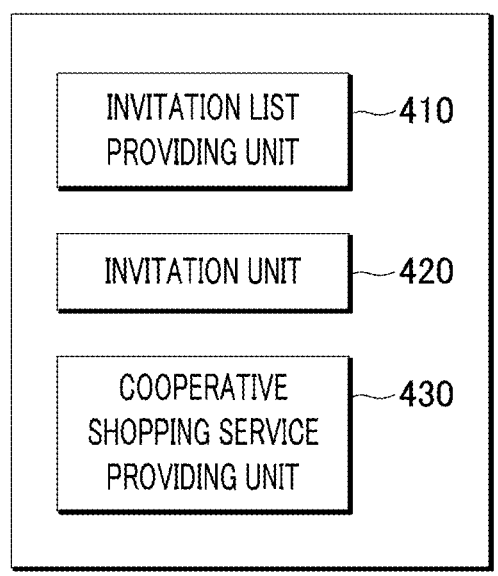
FIG. 4 is a configuration diagram of a host device in accordance with various embodiments described herein.

FIG. 4 is a configuration diagram of a host device in accordance with an embodiment of the present disclosure.

As illustrated in FIG. 4, the host device 110 in accordance with an embodiment may include an invitation list providing unit 410, an invitation unit 420, and a cooperative shopping service providing unit 430. Hereinafter, each of the components will be described in detail.

The invitation list providing unit 410 may provide a list of multiple friends or chat rooms managed by the chat application. For example, the invitation list providing unit 410 may receive the list of multiple friends or multiple chat rooms managed by the chat application from the apparatus 100 at the request of the user and then provide the list to the user. The multiple friends may be acquaintances of the user of the host device 110 and previously managed by the chat application installed in the host device 110, and the chat rooms may be chat rooms where the user of the host device 110 participates in to exchange instant messages with other users.

The invitation unit 420 may receive the user's input to select at least one of the friends or chat rooms from the list. Further, the invitation unit 420 may transmit information about the selected friend or chat room to the apparatus 100 in order for an invitation message to be transmitted to the guest device 120 corresponding to the selected friend or a friend of the selected chat room. Then, the apparatus 100 may transmit the invitation message in the form of an instant message to the guest device 120 through the chat application based on the received information about the selected friend. Meanwhile, any member of the selected chat room may receive the invitation message regardless of whether he/she is a friend registered in the host device 110.

Further, in the case of directly entering the shopping service from the chat application, the invitation unit 420 may transmit information about members of the chat room to the apparatus 100, and, thus, the user of the host device 110 can participate in the cooperative shopping service by making a select and swipe input for an additional menu of a chat room in the ongoing chat room. That is, the invitation unit 420 may provide information about the members of the chat room invited without transmitting and receiving an invitation message, and, thus, the user of the host device 110 can participate in the cooperative shopping service. For example, the additional menu may be displayed in the bottom of the chat room in response to the user's input in the chat room and may include multiple items such as photo, video, camera, and shortcut for cooperative shopping service. The host device 110 may receive an input to select the shortcut for cooperative shopping service displayed in the additional menu and directly invite the members of the chat room to the cooperative shopping service.

The cooperative shopping service providing unit 430 may receive a list of products that are capable of being put into the shopping cart of the host device 110 from the apparatus 100 and then provide the list of products to the user. The list of products may be generated based on the location of a delivery destination determined by the host device 110.

The cooperative shopping service providing unit 430 may receive an input of the user of the host device 110 to determine the location of a delivery destination. For example, the location of a delivery destination may be determined based on the user's input to the host device 110, such as GPS information corresponding to the current location of the host device 110, a specific local name or a point of interest (POI) on the map.

The cooperative shopping service providing unit 430 may receive the user's input to select at least one of the multiple products in the list of products. The cooperative shopping service providing unit 430 may request information about the selected products from the apparatus 100.

The cooperative shopping service providing unit 430 may receive information about the products selected from the list of products by at least one of the host device 110 and the guest device 120 corresponding to a friend accepting the invitation message or a member of the chat room and a friend invited without an invitation message or a member of the chat room from the apparatus 100 and then provide the information to the user.

If payment for the selected products is requested by the user's input, the cooperative shopping service providing unit 430 may transmit payment information about the selected products to the apparatus 100.

Figure 5:
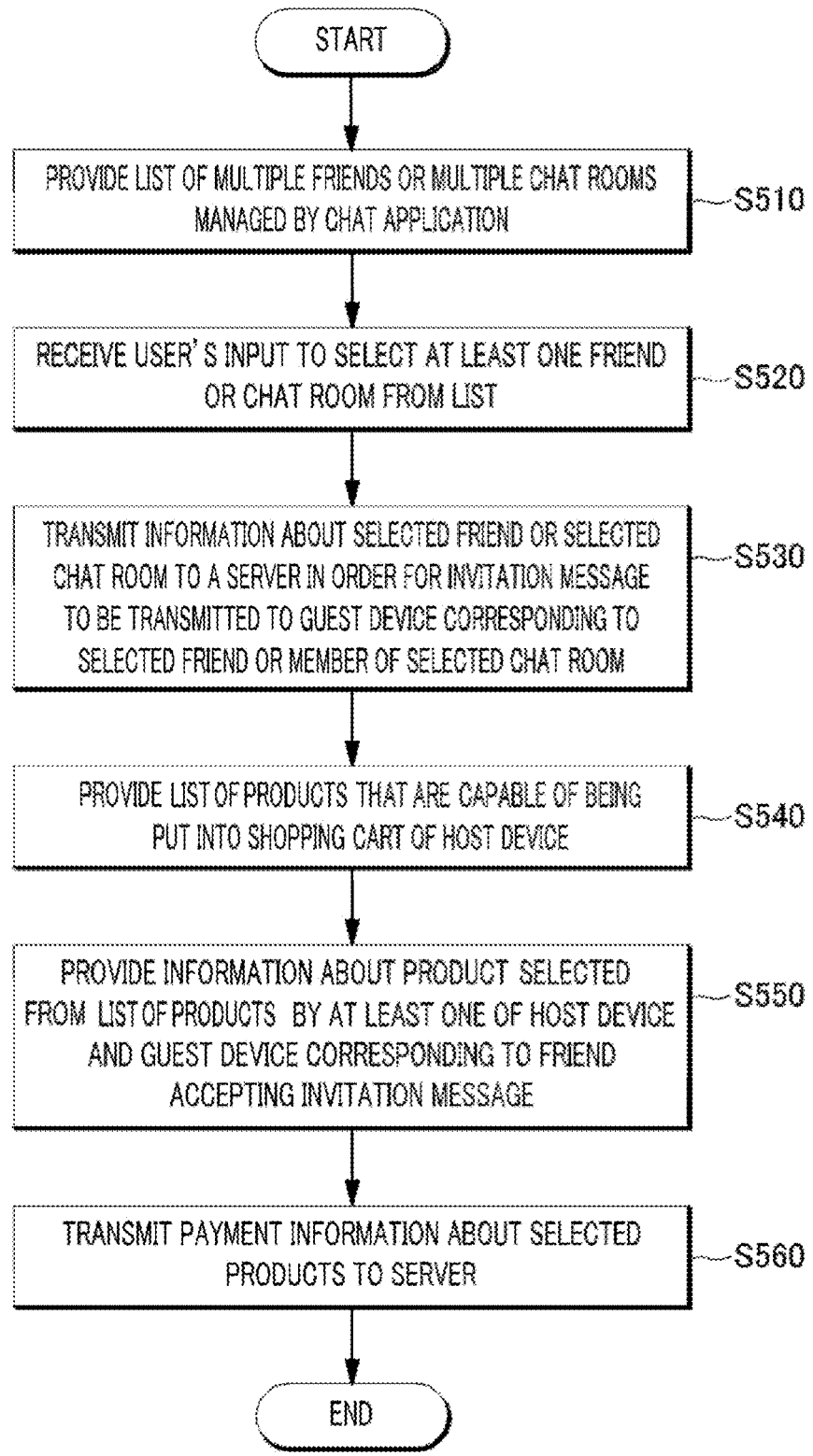
FIG. 5 is a flowchart provided to explain a method for providing a cooperative shopping service in a host device in accordance with various embodiments described herein.

FIG. 5 is a flowchart provided to explain a method for providing a cooperative shopping service in a host device in accordance with an embodiment of the present disclosure.

A method for providing a cooperative shopping service by the host device 110 in accordance with an embodiment illustrated in FIG. 5 includes the processes time-sequentially performed by the cooperative shopping service providing system 1 according to the embodiment illustrated in FIG. 1 to FIG. 4. Therefore, the descriptions of the processes performed by the cooperative shopping service providing system 1 may be applied to the method for providing a cooperative shopping service by the host device 110 according to the embodiment illustrated in FIG. 1 to FIG. 4, even though they are omitted hereinafter.

In a process S510, the host device 110 may provide a list of multiple friends or multiple chat rooms managed by the chat application. Prior to the present process, the host device 110 may request the list of multiple friends or chat rooms from the apparatus 100.

In a process S520, the host device 110 may receive the user's input to select at least one of the friends or chat rooms included in the list.

In a process S530, the host device 110 may transmit information about the selected friend or the selected chat room by the user's input to a server in order for an invitation message to be transmitted to the guest device 120 corresponding to the selected friend or a member of the selected chat room. Meanwhile, the host device 110 may transmit, to the server, information about at least one friend or chat room selected for cooperative shopping service by an input, such as a long touch to any one friend from the list of multiple friends, through the chat application without being provided with the list of multiple friends or chat rooms by the apparatus 100. For another example, the host device 110 may transmit, to the server, information about a member of a chat room selected for cooperative shopping service by an input to select an additional menu of a chat room in the ongoing chat room by the user of the host device 110 without being provided with the list of multiple friends or chat rooms by the apparatus 100.

In a process S540, the host device 110 may provide a list of products that are capable of being put into the shopping cart of the host device 110.

In a process S550, the host device 110 may provide information about product selected from the list of products by at least one of the host device 110 and the guest device 120 corresponding to a friend accepting the invitation message. Further, the host device 110 may provide information about product selected from the list of products by the guest device 120 invited without an invitation message.

In a process S560, the host device 110 may transmit payment information about the selected products to the server. For example, the payment information may refer to or include order information required for ordering the selected products. In this case, the order information may include information about the selected products and information about payment amount. Then, information required for processing payment (approving payment) may be transmitted and received between the apparatus 100 and a credit card company server or a payment agency server.

In the descriptions above, the processes S510 to S560 may be divided into additional processes or combined into fewer processes depending on an embodiment. In addition, some of the processes may be omitted and the sequence of the processes may be changed if necessary.

FIG. 6A to FIG. 6D are example diagrams illustrating a cooperative shopping service provided through a chat application in accordance with an embodiment of the present disclosure.

Figure 6A:
FIG. 6A to FIG. 6D are example diagrams illustrating a cooperative shopping service provided through a chat application in accordance with various embodiments described herein.

FIG. 6A is an example diagram provided to explain a user interface for a shopping cart of a host device in accordance with an embodiment of the present disclosure. Referring to FIG. 6A, the host device 110 may display a shopping cart UI 600 provided when the cooperative shopping service is requested.

The shopping cart UI 600 may include a delivery destination location input window 601, an invite friend button 602, a shopping cart status window 603, and a shopping home button 604.

The delivery destination location input window 601 may display or receive an input of the location of a delivery destination to be the basis for generating a list of products provided to the host device 110 and the guest device 120. For example, the delivery destination location input window 601 may display or receive an input of GPS information corresponding to the current location of the host device 110, a specific local name or a point of interest (POI) on the map as the location of a delivery destination.

The invite friend button 602 may invite a friend corresponding to the guest device 120 to purchase products in cooperation with the host device 110 through the cooperative shopping service in response to the user's input.

The shopping cart status window 603 may display products selected by the host device 110 or the guest device 120 from the list of products and then put in the shopping cart 600.

The shopping home button 604 may switch the screen from the shopping cart 600 being currently displayed to a shopping home in response to the user's input.

Figure 6B:
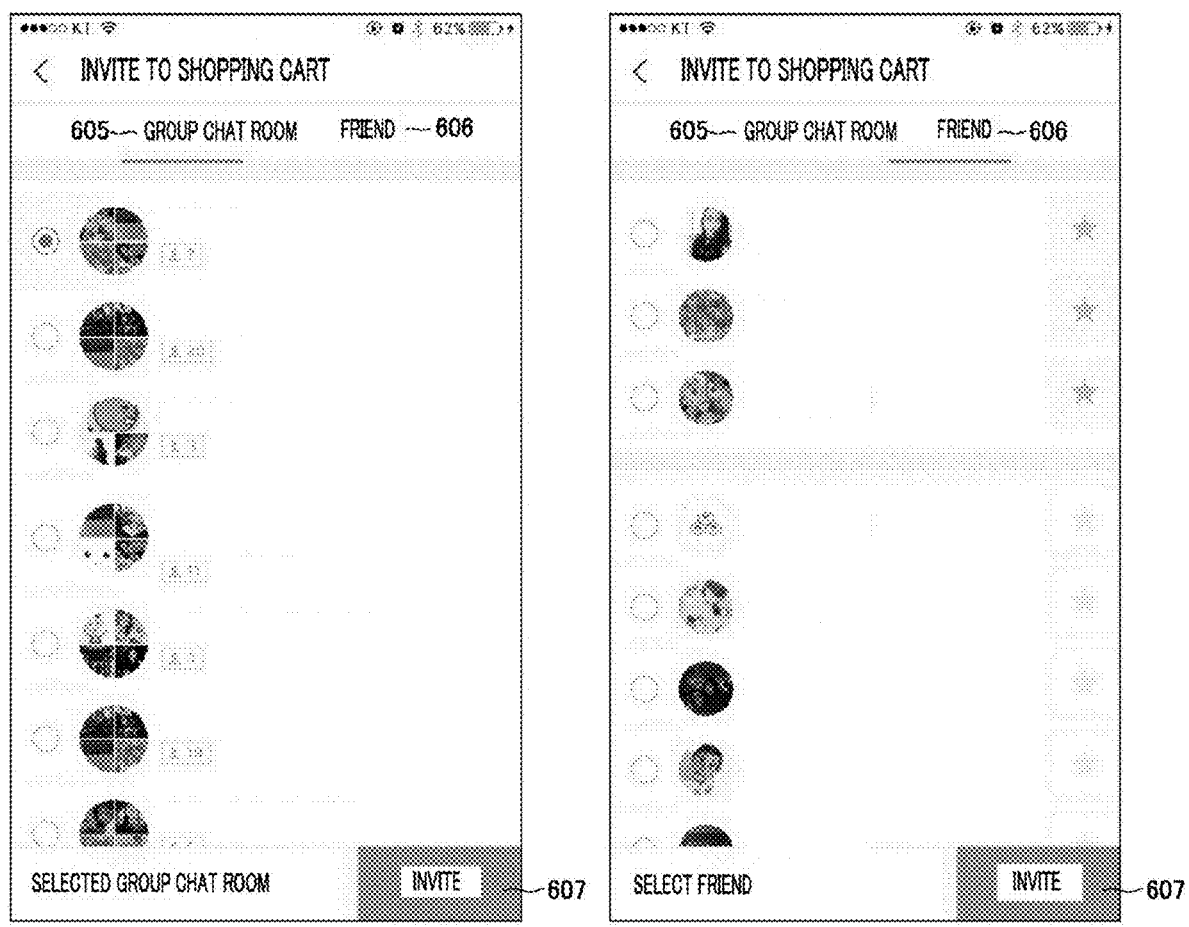

FIG. 6B is an example diagram provided to explain a user interface for an invitation to a shopping cart of a host device in accordance with an embodiment of the present disclosure. Referring to FIG. 6A and FIG. 6B, the host device 110 may display a list of group chat rooms or friends which can be invited to the shopping cart in response to an input to the invite friend button 602. If a group chat room category 605 is selected, the host device 110 may display a group chat room list including multiple group chat rooms, and if a friend category 606 is selected, the host device 110 may display a friend list including multiple friends.

The host device 110 may invite at least one of the group chat rooms or friends selected by an input to an invite button 607 to the shopping cart of the user.

Figure 6C:

FIG. 6C is an example diagram provided to explain a user interface for a shopping home of a host device in accordance with an embodiment of the present disclosure. Referring to FIG. 6A to FIG. 6C, the host device 110 may display a shopping home including an add region 608, a my shopping history region 609, and a shopping status window 610 in response to an input to the shopping home button 604.

The ad region 608 may display an ad of "A" company provided by the cooperative shopping service.

The my shopping history region 609 may display a history of using the cooperative shopping service such as information about at least one product purchased through previous cooperative shopping services.

The shopping status window 610 may display the number of users of the guest devices 120 currently performing the cooperative shopping service in the shopping cart of the host device 110.

Figure 6D:
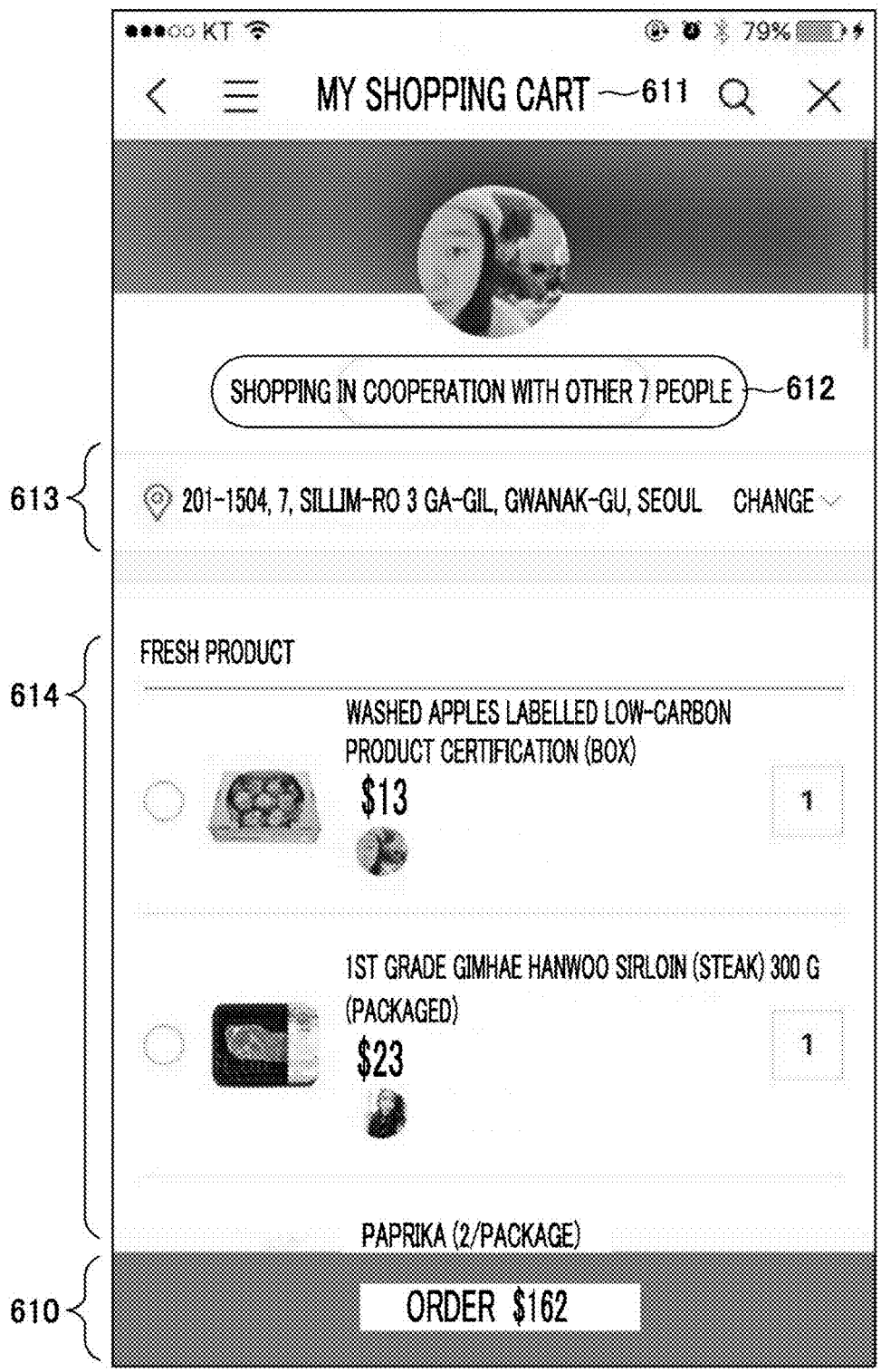

FIG. 6D is an example diagram provided to explain a user interface for a shopping cart of a host device in which products are put in accordance with an embodiment of the present disclosure. Referring to FIG. 6D, a my shopping cart UI 611 of the host device 110 in which products are put may display a shopping status window 612, a delivery destination location input window 613, a list of products in cart 614, and an order button 615.

The shopping status window 612 may display the number of users of the guest devices 120 currently performing the cooperative shopping service in the shopping cart of the host device 110.

The delivery destination location input window 613 may display or receive an input of a delivery destination to be the basis for generating a list of products provided to the host device 110 and the guest device 120.

The list of products in cart 614 may display products selected by the host device 110 or the guest device 120 from the list of products and then put in the shopping cart 611 of the host device 110.

The order button 615 may proceed with an order for at least one product put in the shopping cart 611 of the host device 110 in response to the user's input.

Figure 7:
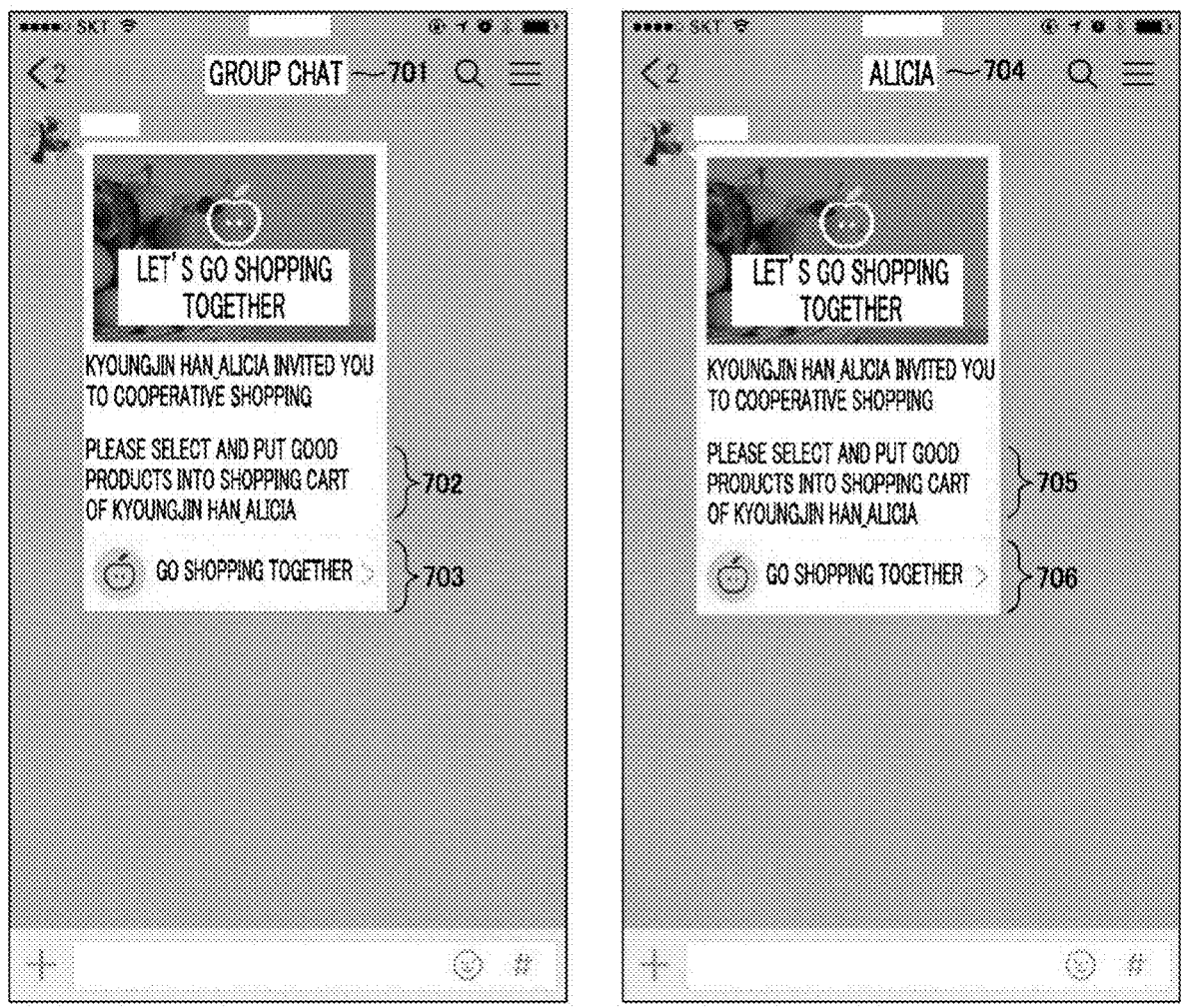
FIG. 7 is an example diagram illustrating an invitation message provided through a chat application in a cooperative shopping service in accordance with various embodiments described herein.

FIG. 7 is an example diagram illustrating an invitation message provided through a chat application in a cooperative shopping service in accordance with an embodiment of the present disclosure.

The left diagram in FIG. 7 is an example diagram provided to explain a group chat room that receives an invitation message in accordance with an embodiment of the present disclosure. Referring to FIG. 7, a group chat room 701 may receive an invitation message including a shopping information region 702 and an accept button 703.

The group chat room 701 refers to a group chat room where the host device 110 participates in, and members of the group chat room 701 can exchange information through instant messages displayed in the group chat room 701.

The group chat room 701 refers to a group chat room invited by the host device 110 to the cooperative shopping service and may receive the invitation message in the form of an instant message. The group chat room 701 can receive the invitation message even if any one of the members of the group chat room 701 is not registered as a friend of the host device 110.

The shopping information region 702 may display a comment input from the host device 110 or a basic comment about the cooperative shopping service.

The accept button 703 may accept an invitation from the host device 110 in response to the user's input. For example, the member of the group chat room 701 may participate in the cooperative shopping service requested by the host device 110 through the accept button 703 to the invitation message.

The right diagram in FIG. 7 is an example diagram provided to explain a private chat room that receives an invitation message in accordance with an embodiment of the present disclosure. Referring to FIG. 7, a private chat room 704 may receive an invitation message including a shopping information region 705 and an accept button 706.

The private chat room 704 refers to a private chat room where the host device 110 participates in, and the host device 110 included in the private chat room 704 and a friend registered in the host device 110 can exchange information through instant messages displayed in the private chat room 704.

The private chat room 704 refers to a private chat room corresponding to a friend invited by the host device 110 to the cooperative shopping service from among multiple friends registered in the host device 110 and may receive the invitation message in the form of an instant message.

The shopping information region 705 may display a comment input from the host device 110 or a basic comment about the cooperative shopping service.

The accept button 706 may accept an invitation from the host device 110 in response to the user's input. For example, the friend corresponding to the private chat room 704 may participate in the cooperative shopping service requested by the host device 110 through the accept button 706 to the invitation message.

Figure 8:
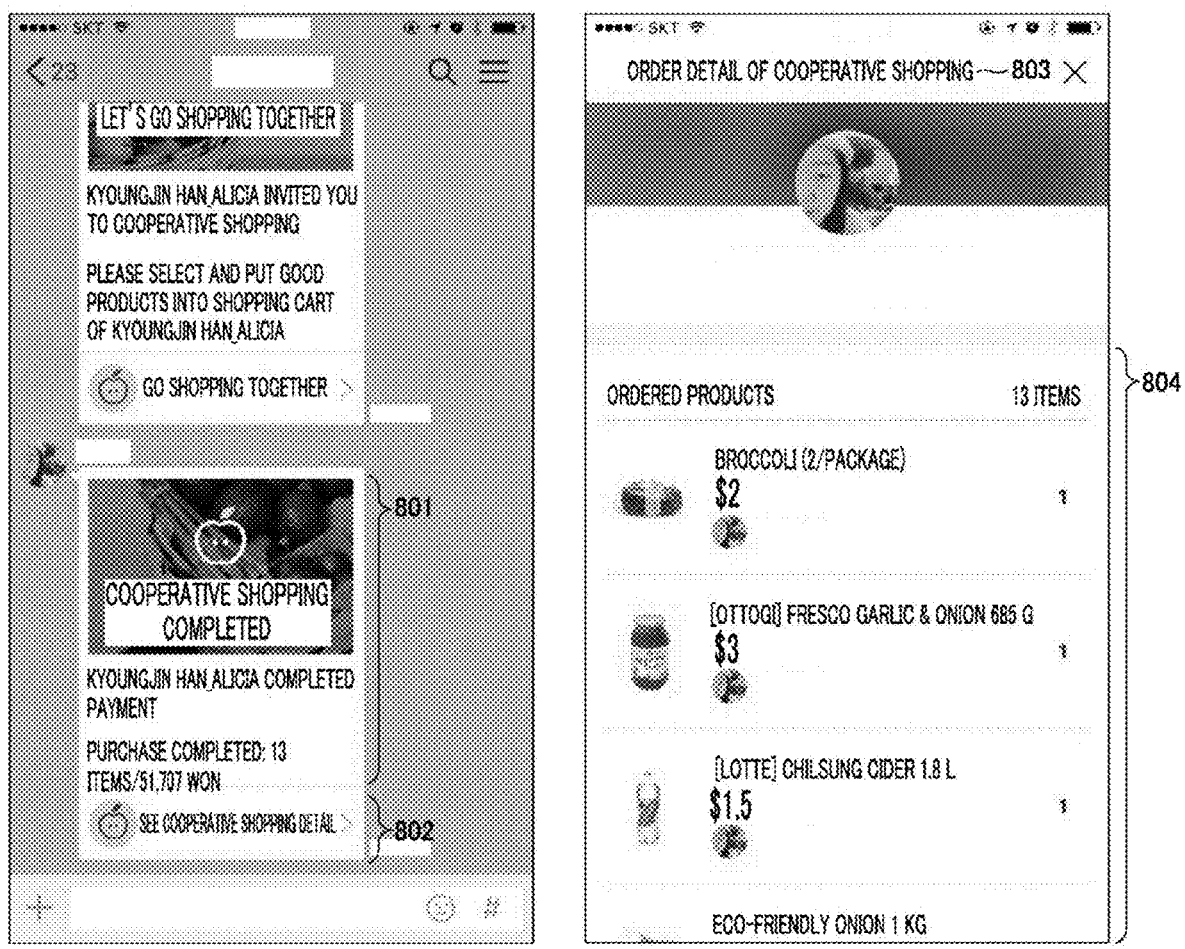
FIG. 8 is an example diagram illustrating a cooperative shopping service when payment for products is completed in accordance with various embodiments described herein.

FIG. 8 is an example diagram illustrating a cooperative shopping service when payment for products is completed in accordance with an embodiment of the present disclosure.

The left diagram in FIG. 8 is an example diagram provided to explain a group chat room that receives a cooperative shopping complete message in accordance with an embodiment of the present disclosure. Referring to FIG. 8, a group chat room may receive a cooperative shopping complete message including a shopping complete information region 801 and a detail check button 802 after the cooperative shopping service is terminated. Meanwhile, any member of the group chat room who has not participated in the cooperative shopping service may be set not to read the cooperative shopping complete message.

The group chat room refers to a group chat room invited by the host device 110 to the cooperative shopping service and may receive the cooperative shopping complete message in the form of an instant message after the cooperative shopping service is terminated. The group chat room can receive the cooperative shopping complete message even if any one of the members of the group chat room has not participated in the cooperative shopping service of the host device 110.

The shopping complete information region 801 may display a comment about completion of the cooperative shopping service, the number of products purchased, and the total purchase amount.

The detail check button 802 is configured to check details of the cooperative shopping service terminated by the user's input. For example, the detail check button 802 of the cooperative shopping complete message may enable the members of the group chat room to read the details of the terminated cooperative shopping service.

Meanwhile, a private chat room may also receive the above-described cooperative shopping complete message after the cooperative shopping service is terminated.

The right diagram in FIG. 8 is an example diagram provided to explain a user interface for checking details of the terminated cooperative shopping service in accordance with an embodiment of the present disclosure. Referring to FIG. 8, the members of the group chat room may receive an order detail page 803 for the terminated cooperative shopping service through the detail check button 802 of the received cooperative shopping complete message.

The order detail page 803 for the terminated cooperative shopping service may display a list 804 of ordered products selected by the host device 110 or the guest device 120 and paid for by the host device 110.

The ordered list of products 804 may display information about at least one ordered product in the form of a list, and the information about each ordered product may include product name, price, discount price, information about a user corresponding to the guest device 120 selecting the product, the number of products, the total number of ordered products, or information about a store from which the product is purchased.

Figure 9:
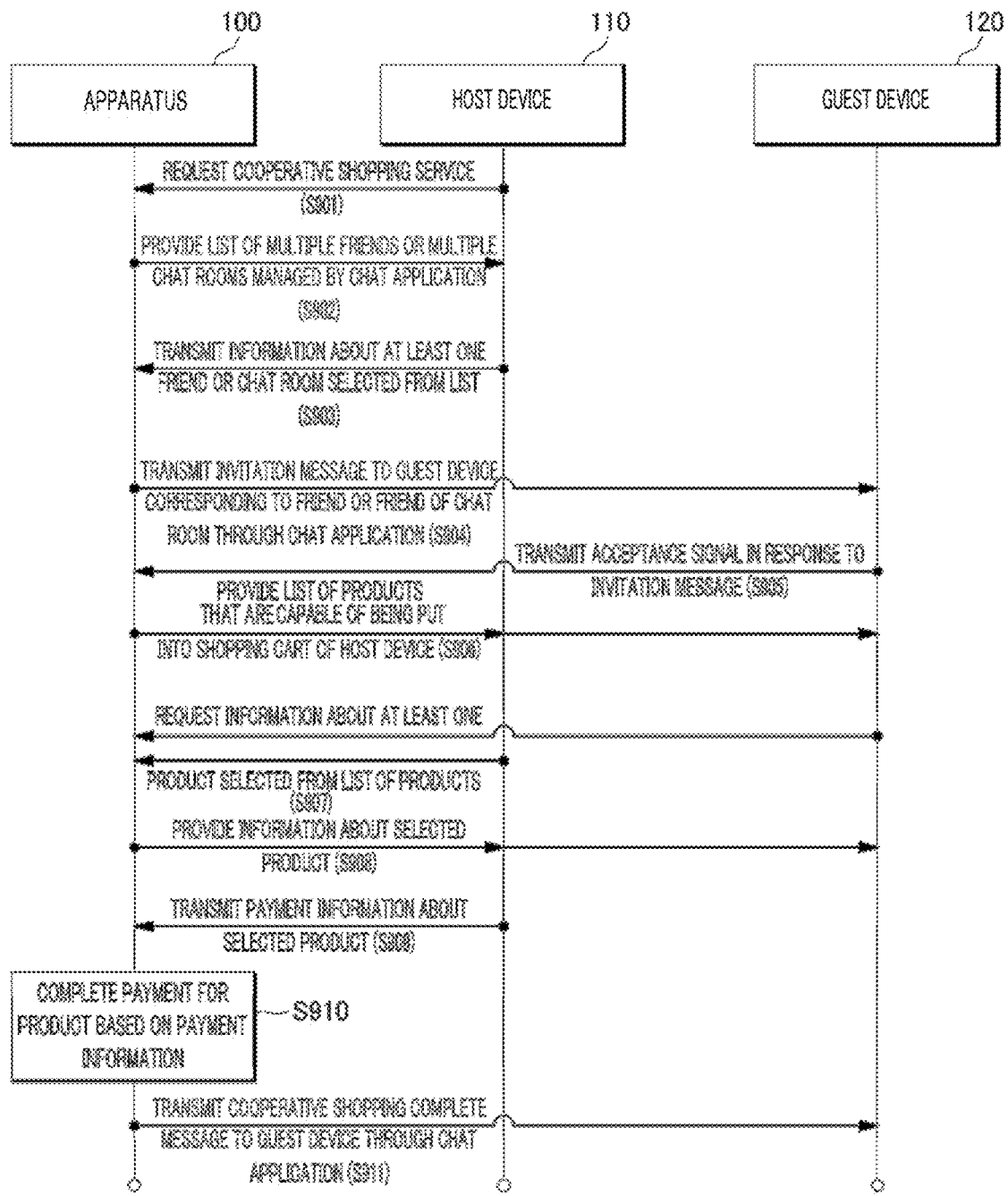
FIG. 9 is a signal flowchart provided to explain a method for providing a cooperative shopping service in a cooperative shopping service providing system in accordance with various embodiments described herein.

FIG. 9 is a signal flowchart provided to explain a method for providing a cooperative shopping service in a cooperative shopping service providing system in accordance with an embodiment of the present disclosure.

In a process S901, the host device 110 may request the cooperative shopping service from the apparatus 100.

In a process S902, the apparatus 100 may provide a list of multiple friends or multiple chat rooms managed by the chat application installed in the host device 110.

In a process S903, the host device 110 may transmit information about at least one of the friends or chat rooms selected from the list to the apparatus 100.

In a process S904, the apparatus 100 may transmit an invitation message to the guest device 120 corresponding to the friend or a friend of the chat room through the chat application.

In a process S905, the guest device 120 may transmit an acceptance signal in response to the invitation message to the apparatus 100.

In a process S906, the apparatus 100 may provide a list of products that are capable of being put into the shopping cart of the host device 110 to the host device 110 and the guest device 120.

In a process S907, the host device 110 and the guest device 120 may request information about at least one product selected from the list of products from the apparatus 100.

In a process S908, the apparatus 100 may provide the information about the selected products to the host device 110 and the guest device 120 in response to the request.

In a process S909, the host device 110 may transmit payment information about the selected products to the apparatus 100.

In a process S910, the apparatus 100 may complete payment for the products based on the payment information.

In a process S911, the apparatus 100 may transmit a cooperative shopping complete message to the guest device 120 through the chat application.

In the descriptions above, the processes S901 to S911 may be divided into additional processes or combined into fewer processes depending on an embodiment. In addition, some of the processes may be omitted and the sequence of the processes may be changed if necessary.

Figure 10:
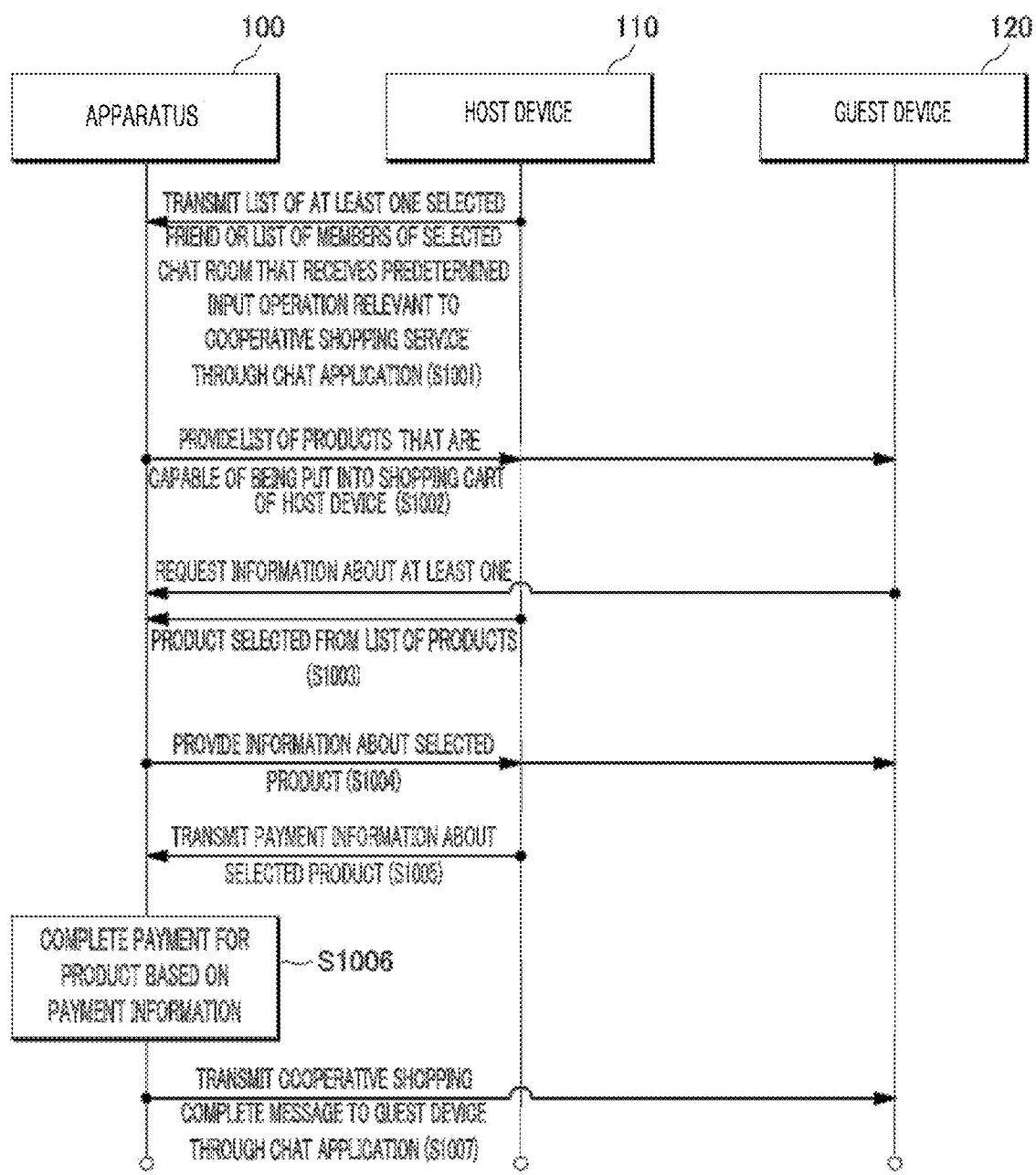
FIG. 10 is a signal flowchart provided to explain a method for providing a cooperative shopping service in a cooperative shopping service providing system in accordance with various embodiments described herein.

FIG. 10 is a signal flowchart provided to explain a method for providing a cooperative shopping service in a cooperative shopping service providing system in accordance with an embodiment of the present disclosure.

In a process S1001, the host device 110 may transmit a list of at least one selected friend or a list of members of a selected chat room that receives a predetermined input operation (e.g., a swipe input to the chat room) relevant to the cooperative shopping service to the apparatus 100 through the chat application. For example, the host device 110 may receive an input to select an additional menu relevant to the cooperative shopping service or receive a swiping operation mapped to the cooperative shopping service through the chat room and thus provide the cooperative shopping service to the members of the chat room.

In a process S1002, the apparatus 100 may provide a list of products that are capable of being put into the shopping cart of the host device 110 to the host device 110 or the guest device 120 corresponding to the transmitted list of friends or the transmitted list of members of the chat room.

In a process S1003, the host device 110 and the guest device 120 may request information about at least one product selected from the list of products from the apparatus 100.

In a process S1004, the apparatus 100 may provide the information about the selected products to the host device 110 and the guest device 120 in response to the request.

In a process S1005, the host device 110 may transmit payment information about the selected products to the apparatus 100.

In a process S1006, the apparatus 100 may complete payment for the products based on the payment information.

In a process S1007, the apparatus 100 may transmit a cooperative shopping complete message to the guest device 120 through the chat application.

In the descriptions above, the processes S1001 to S1007 may be divided into additional processes or combined into fewer processes depending on an embodiment. In addition, some of the processes may be omitted and the sequence of the processes may be changed if necessary.

The method for providing a cooperative shopping service in association with a chat application described above with reference to FIG. 1 to FIG. 10 can be implemented in a computer program stored in a medium to be executed by a computer or a storage medium including instructions codes executable by a computer. Also, method for providing a cooperative shopping service in association with a chat application described above with reference to FIG. 1 to FIG. 10 can be implemented in a computer program stored in a medium to be executed by a computer.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An apparatus that provides a cooperative shopping service in association with a chat application, comprising:

a server including one or more processors configured to communicate with a host device and a guest device, wherein the server comprises a friend information receiving unit, an invitation unit, and a cooperative shopping service providing unit, wherein the friend information receiving unit is configured to receive a selected identifier transmitted from the host device on which a version of the chat application is installed, wherein the selected identifier is included in a list of identifiers displayed in the version of the chat application installed on the host device, and the list of identifiers is managed by the chat application, the selected identifier is selected through a user interface of the version of the chat application installed on the host device, and the selected identifier is associated with at least one guest device, on each of which a version of the chat application is installed;

the invitation unit is configured to:

generate an invitation message and an invitation link for the selected identifier, transmit the generated invitation message and the generated invitation link to the host device and the at least one guest device, wherein the invitation message and the invitation link are displayed in the user interface of the version of the chat application installed respectively on the host device and the at least one guest device; and transmit the generated invention message to a group chat room in which the host device or the at least one guest device participates through the chat application; and the cooperative shopping service providing unit is configured to:

generate a list of products in response to an acceptance signal, in response to the invitation message, from the version of the chat application installed on the at least one guest device, add at least one product from the generated list of products into a shopping cart displayed on the host device upon a request from the host device or the at least one guest device, and transmit order information about the added product to the version of the chat application installed on, respectively, at least one of the host device or the at least one guest device, wherein the list of products is generated based on a location of a delivery destination transmitted from the host device, and the invitation unit is further configured to transmit a cooperative shopping complete message to the group chat room through the chat application when the cooperative shopping service is terminated.

2. The apparatus of claim 1, wherein the location of the delivery destination is determined based on GPS information of the host device or a user's input to the host device.

3. The apparatus of claim 1, wherein the list of products includes information about prices, total stocks, and kinds of products being sold in stores located within a predetermined distance from the location of the delivery destination determined by the host device or stores located in a predetermined area corresponding to the location of the delivery destination.

4. The apparatus of claim 3, wherein the cooperative shopping service providing unit is further configured to request, from a store server, information about a store detected based on the location of the delivery destination and information about products being sold in the store.

5. The apparatus of claim 1, wherein if payment information for the selected products is transmitted according to the order information, the cooperative shopping service providing unit terminates the cooperative shopping service.

6. The apparatus of claim 1, wherein the cooperative shopping complete message includes at least one of the number of completely purchased products among the products paid for and the total purchase amount.

7. The apparatus of claim 1, wherein if the cooperative shopping complete message is provided to a group chat room, the cooperative shopping complete message is available to be read only by a version of the chat application installed on, respectively, a host device or a guest device participating in cooperative shopping with members in the group chat room.

8. The apparatus of claim 1, wherein the cooperative shopping service providing unit provides at least one of the host device or the at least one guest device information about products purchased through the cooperative shopping service.

9. The apparatus of claim 1, wherein
if at least one identifier of a guest device is selected from the list of identifiers by the host device, the invitation message is transmitted to a private chat room for a guest device associated with the selected identifier, and
if at least one identifier of a group chat room is selected from the list of identifiers by the host device, the invitation message is transmitted to the selected group chat room.

10. The apparatus of claim 1, wherein the friend information receiving unit is further configured to:
receive information of members of a displayed chat room by receiving a user's interaction to the chat room while the host device displays the chat room in the version of the chat application installed on the host device, or
receive information about friends or chat rooms managed by the chat application while the host device displays an execution screen of the cooperative shopping service.

11. The apparatus of claim 1, wherein payment information for the selected products is transmitted from the host device based on the order information.

12. A method, performed by one or more processors, for providing a cooperative shopping service in association with a chat application, comprising:
receiving a selected identifier transmitted from a version of the chat application installed on a host device, wherein
the selected identifier is included in a list of identifiers displayed in the version of the chat application installed on the host device, and the list of identifiers is managed by the chat application,
the selected identifier is selected through a user interface of the version of the chat application installed on the host device, and
the selected identifier is associated with at least one guest device, on each of which the chat application is installed;
generating an invitation message and an invitation link for the selected identifier;
transmitting the generated invitation message and the generated invitation link to the host device and the at least one guest device, wherein the invitation message and the invitation link are displayed in the user interface of the version of the chat application installed respectively on the host device and the at least one guest device;
generating a list of products in response to an acceptance signal from the at least one guest device responding to the invitation message, adding at least one product listed in the list of products to a shopping cart displayed on the host device upon a request from the host device or the at least one guest device;
transmitting order information about the at least one product to the version of the chat application installed on, respectively, at least one of the host device or the at least one guest device; and
transmitting a cooperative shopping complete message to the group chat room through the chat application in response to the cooperative shopping service being terminated,
wherein the list of products generated based on a location of a delivery destination transmitted from the host device; and
transmitting the generated invitation message to a group chat room in which the host device or the at least one guest device participates through the chat application.

13. A host device that provides a cooperative shopping service in association with a chat application, comprising:
at least one processor having the chat application which includes:
an invitation unit configured to:
receive a user's input to select an identifier through a user interface of the host device, wherein
the selected identifier is included in a list of identifiers displayed by a version of the chat application installed on the host device, and
the list of identifiers is managed by the version of the chat application installed on the host device, and
the selected identifier is associated with at least one guest device, on each of which a version of the chat application is installed,
generate an invitation message and an invitation link for the selected identifier, and
transmit the invitation message and the invitation link to the at least one guest device, wherein the invitation message and the invitation link are displayed in the version of the chat application installed on the at least one guest device; and
a cooperative shopping service providing unit configured to:
generate a list of products based on a location of a determined delivery destination,
add at least one product listed in the list of products into a shopping cart displayed on the host device or the at least one guest device upon a request on from the host device or the at least one guest device, and
transmit order information for the at least one product to at the at least one guest device, and
wherein the invitation unit is further configured to transmit the generated invitation message to a group chat room in which the host device or the at least one guest device participates through the chat application, and the invitation unit is further configured to transmit a cooperative shopping complete message to the group chat room through the chat application when the cooperative shopping service is terminated.

* * * * *